(12) United States Patent
Hinds et al.

(10) Patent No.: US 9,054,891 B2
(45) Date of Patent: Jun. 9, 2015

(54) DISTRIBUTING SESSION INITIATION PROTOCOL CONTENT TO UNIVERSAL PLUG AND PLAY DEVICES IN A LOCAL NETWORK

(75) Inventors: Elenita Caturan Hinds, Libertyville, IL (US); Mark Hinds, Libertyville, IL (US); James J. Morikuni, Itasca, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 419 days.

(21) Appl. No.: 12/059,614

(22) Filed: Mar. 31, 2008

(65) Prior Publication Data

US 2009/0248788 A1    Oct. 1, 2009

(51) Int. Cl.
*G06F 15/16*        (2006.01)
*H04L 12/28*        (2006.01)
*H04L 29/06*        (2006.01)

(52) U.S. Cl.
CPC ........ *H04L 12/2834* (2013.01); *H04L 65/1026* (2013.01); *H04L 65/1089* (2013.01); *H04L 2012/2849* (2013.01)

(58) Field of Classification Search
USPC ................................................. 709/223–226
See application file for complete search history.

(56) References Cited

U.S. PATENT DOCUMENTS

| 2006/0140199 A1 | 6/2006 | Ma et al. |
| 2006/0153072 A1 | 7/2006 | Bushmitch et al. |
| 2006/0245403 A1 | 11/2006 | Kumar |
| 2006/0291412 A1 | 12/2006 | Naqvi et al. |
| 2007/0198669 A1* | 8/2007 | Convertino et al. .......... 709/220 |
| 2009/0175296 A1 | 7/2009 | P et al. |

OTHER PUBLICATIONS

PCT Search Report and Written Opinion, RE: Application #PCT/US2009/038476 May 8, 2009.
Johansson R: "Converging Requirements on the Residential Gateway" (whole document) Oct. 6, 2005.
International Preliminary Report on Patentability dated Oct. 5, 2010 in International Patent Application No. PCT/US2009/038476.
Office Action dated May 10, 2013 in European Patent Application No. EP 9728169.5.
Vilei, A., et al., "A New UPnP Architecture for Distributed Video Voice Over IP", In Proceedings of the 5th Int'l Conference on Mobile and Ubiquitous Multimedia, Dec. 4-6, 2006, Stanford, CA, USA, pp. 1-7.

* cited by examiner

*Primary Examiner* — Jackie Zuniga Abad
(74) *Attorney, Agent, or Firm* — Byrne Poh LLP

(57) ABSTRACT

A system and method for distributing session initiation protocol (SIP) content to Universal Plug and Play (UPnP) devices in a local network. The system and method employ, for example, a SIP user agent (UA) and a UPnP media server (MS) that can communicate with each other so that when the SIP UA receives SIP content from a remote SIP terminal, the SIP UA and UPnP MS cooperate to enable the UPnP MS to create an object so as to provide the object including the content to a rendering device in the local network. Similarly, when a device on the local network sends an object to the UPnP MS, the UPnP MS and SIP UA cooperate to enable the SIP UA to send the content of the object as SIP content to a remote SIP terminal.

10 Claims, 4 Drawing Sheets

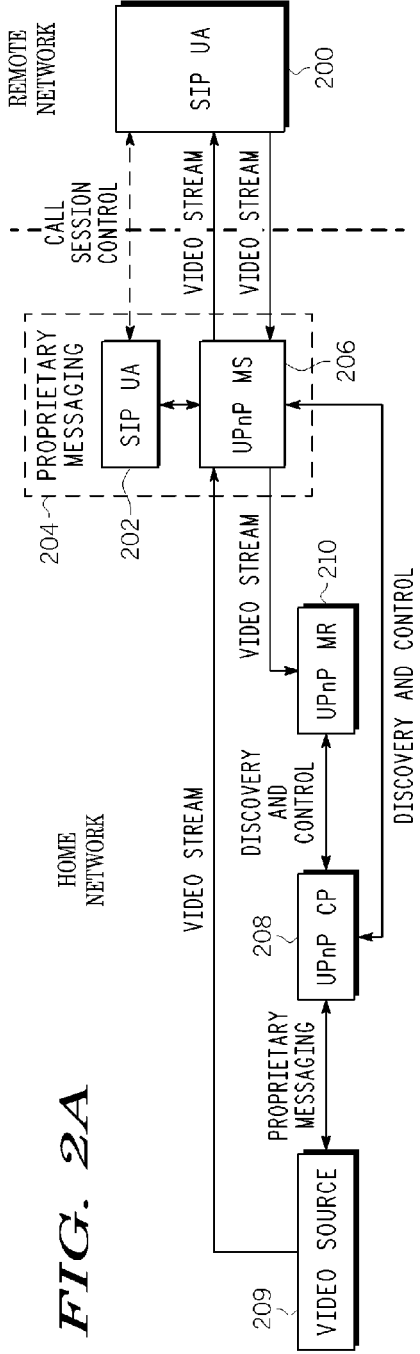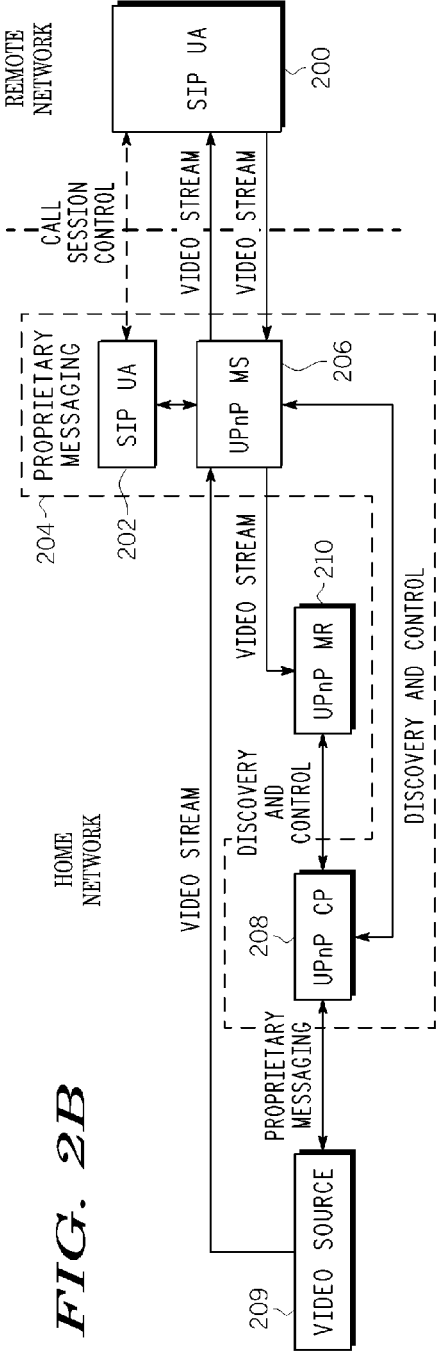

DISTRIBUTING SESSION INITIATION PROTOCOL CONTENT TO UNIVERSAL PLUG AND PLAY DEVICES IN A LOCAL NETWORK

FIELD OF THE INVENTION

The present invention relates generally to session initiation protocol (SIP) communication. More particularly, the present invention relates to a system and method for distributing SIP content to Universal Plug and Play (UPnP) devices in a local area or home network. As UPnP is a fundamental building block of the Digital Living Network Alliance (DLNA) specification, the present invention equally relates to a system and method for distributing SIP content to DLNA devices in a local area or home network.

BACKGROUND

One of the most widely accepted home networking technologies is UPnP. The UPnP standard enables devices such as personal computers (PCs), televisions, set-top boxes and mobile phones to automatically discover each other, connect, and interoperate seamlessly. UPnP is a fundamental building block of the DLNA specification, which may be currently considered a de facto standard for home network interoperability.

The deployment of SIP and Internet Protocol multimedia subsystem (IMS) has made IP-based video telephony a much more compelling business proposition for mobile carriers than in the past. This service provides the ultimate "friends-and-family" experience, enabling users to connect face-to-face, over any distance, as if they were in the same room.

As can be appreciated, video telephony services typically require dedicated videophones or mobile phones with built-in cameras. In other cases, webcams are used with computer soft clients. Most of these devices are built upon SIP technology that can establish, modify and terminate multimedia sessions or calls.

This video service becomes even more compelling if it can be enabled without requiring dedicated SIP video devices at both endpoints. For example, it could be desirable to provide the capability for a video stream initiating from a SIP-enabled mobile phone in a wide area network to be displayed on a non-SIP-enabled television in a home instead of on the small screen of another SIP-enabled mobile phone in that same home. However, this functionality would require the ability to redirect the SIP-based video stream to non-SIP devices, such as a television, on the local area home network.

As discussed above, SIP is used primarily as a protocol for communications (e.g., video streaming) over a wide area network, while UPnP and DLNA are used to communicate over a local network, such as home or local area networks. As can be appreciated by one skilled in the art, it is generally considered impractical to modify the base of UPnP and DLNA consumer electronics devices that have been installed in the home or local area network to accommodate SIP-based video streaming.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2A is a conceptual diagram of an example of a device employed with the network as shown in FIG. 1 according to an embodiment of the present invention.

FIG. 2B is a conceptual diagram of an example of a device employed with the network as shown in FIG. 1 according to a second embodiment of the present invention.

Figure 1:
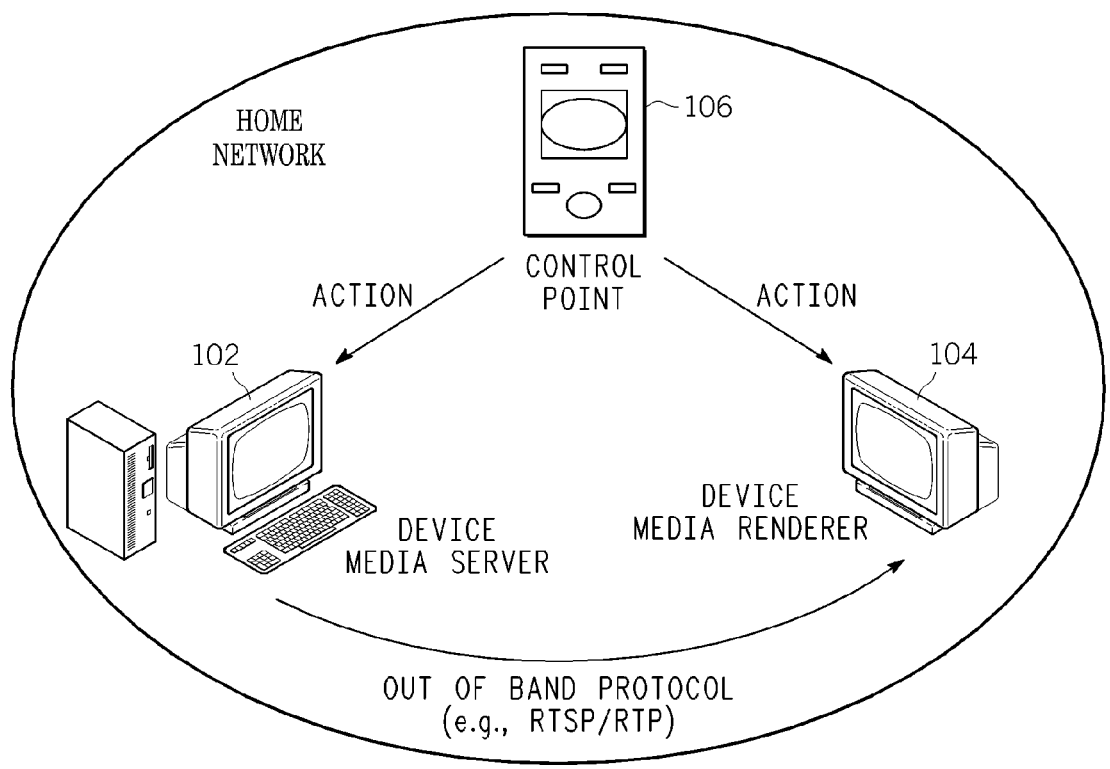
FIG. 1 is a conceptual diagram of an example of a local area home network containing UPnP and/or DLNA devices with which an embodiment of the invention can be used.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for distributing SIP content to UPnP and/or DLNA devices in a local area or home network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system for distributing SIP content to UPnP and/or DLNA devices in a local area or home network described herein. The non-processor circuits may include, but are not limited to, a radio receiver, a radio transmitter, signal drivers, clock circuits, power source circuits, and user input devices. As such, these functions may be interpreted as steps of a method for distributing SIP content to UPnP and/or DLNA devices in a local area or home network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will now be discussed, the embodiments of the present invention described herein provide a system and method for distributing SIP content to UPnP and/or DLNA devices in a local area or home network. The system and method are capable of redirecting SIP-initiated video streams from a SIP mobile device on, for example, a Wide Area Network (WAN) to UPnP and/or DLNA (non-SIP) devices, such as a PC or a television, on a home network.

As shown in FIG. 1, a typical UPnP and/or DLNA-based home network 100 includes at least one UPnP media server 102, at least one UPnP control point 106 and at least one UPnP media renderer 104. The UPnP media server 102 can be, for example, a PC, network server, file server, or any other suitable device capable of sharing multimedia content across the local network 100. The UPnP media renderer 104 can be, for example, a television, PC or any other suitable type of device capable of playing this multimedia content. The UPnP control point 106 is the component capable of browsing the UPnP media servers 102 and playing or pushing content to the UPnP media renderer 104 for playback by, for example, means of UPnP action requests as understood by one skilled in the art. As can be seen further in FIG. 1, while the interaction between the UPnP control point 106 and the devices UPnP media server 102 and UPnP media renderer 104 is through UPnP actions, the actual transfer of content between the devices themselves is through out-of-band (i.e., non-UPnP) protocols such as Real Time Streaming Protocol (RTSP)/Real-Time Transport Protocol (RTP).

The UPnP media server 102 may be viewed as the focal point of the local network 100 and generally is responsible for exposing and distributing content that is stored either locally or on an externally accessible device, such as an external server or database. In the embodiment depicted in FIG. 1, the UPnP media server 102 includes peripheral devices such as a monitor and/or keyboard for interacting with a user; however, in other embodiments, the UPnP media server 102 need not include such peripheral devices. The UPnP media server 102 can list all content in the form of a content directory or hierarchy that a UPnP control point 106 can search or browse. Content in the hierarchy can be represented by "objects," with each object containing, for example, metadata information about the content and how to retrieve the content as can be appreciated by one skilled in the art.

As discussed in the Background section above, SIP is used as a protocol for communications (e.g., video streaming) over the WAN, while UPnP is generally used to communicate over a local network 100, such as a home or local area network. Hence, to route multimedia content, such as video packets, from a remote SIP terminal 200 as shown in FIG. 2, to UPnP devices, such as a UPnP media renderer 104 in the home, an embodiment of the present invention operates to enhance a UPnP media server 102 so that when a user receives, for example, a SIP call, an object is created in the content directory structure of the UPnP media server 102 to represent this call. This object will have its own resource URL, and metadata information much like a normal UPnP object. To facilitate this process, a new UPnP class name is required, for example, "object.item.videoItem.sipCall," to indicate that this is a SIP-based call stream. Since the call is now represented as a UPnP content directory object, the call can be distributed in the network 100, just like any other UPnP content directory object on the media server 102.

That is, the embodiments of the present invention described herein operate to represent a SIP video session as a UPnP content directory object that is treated no differently by the media server 102 than an ordinary multimedia file (e.g., MP3, JPEG and so on). The UPnP control point 106 controlling the UPnP media server 102 will be able to use browse or search actions to access this object and to configure the home UPnP media renderer 104 (e.g., PC, television, etc.) so that the video packets from the remote SIP terminal 200 are redirected to this device from the UPnP media server 102 using standard UPnP actions.

FIG. 2A illustrates an example of the interaction that occurs between components employed by the embodiments of the present invention described herein. As indicated in this example, the SIP terminal 200 on a remote network, such as a WAN, initiates a SIP session with a SIP user agent (UA) 202 (User Agent) that can be, for example, inside the home. Multiple elements in FIG. 2A can be co-located within one chassis. In one embodiment, the SIP UA 202 and the UPnP Media Server 206 are co-located on a residential gateway, network router, or like device. In another embodiment, as shown in FIG. 2B, the SIP UA 202, UPnP Media Server 206, and UPnP control point 208 can reside in a mobile device such as a cellular phone, thereby allowing such mobile device to redirect the flow of the video.

As further shown, the UPnP media server 206 communicates with a UPnP control point 208, such as 106 discussed above, and a UPnP media renderer 210, such as 104 discussed above. Typical discovery and control operations are performed between the UPnP control point 208 and UPnP media renderer 210, as well as between the UPnP control point 208 and the UPnP media server 206 as shown.

As will now be described in more detail with reference to FIGS. 3A and 3B, during operation, the SIP session is terminated on the SIP UA 202, meaning that SIP messaging does not penetrate the local network 100 beyond the SIP UA 202. The SIP session is used to establish a live video stream which uses, for example, the Real-Time Transport Protocol (RTP) as understood by one skilled in the art.

As shown in FIGS. 2A and 2B, the SIP UA 202 and UPnP media server 206 typically reside on the same device and communicate with each other using internal (i.e., proprietary) messaging schemes. In order for the control point 208 to be notified of incoming SIP calls, the control point 208 subscribes to a UPnP event provided by the Content Directory Service of the UPnP media server 206. This event can be a new event, shown as RING event 300 in the flow diagram of FIG. 3A.

Figure 3A:
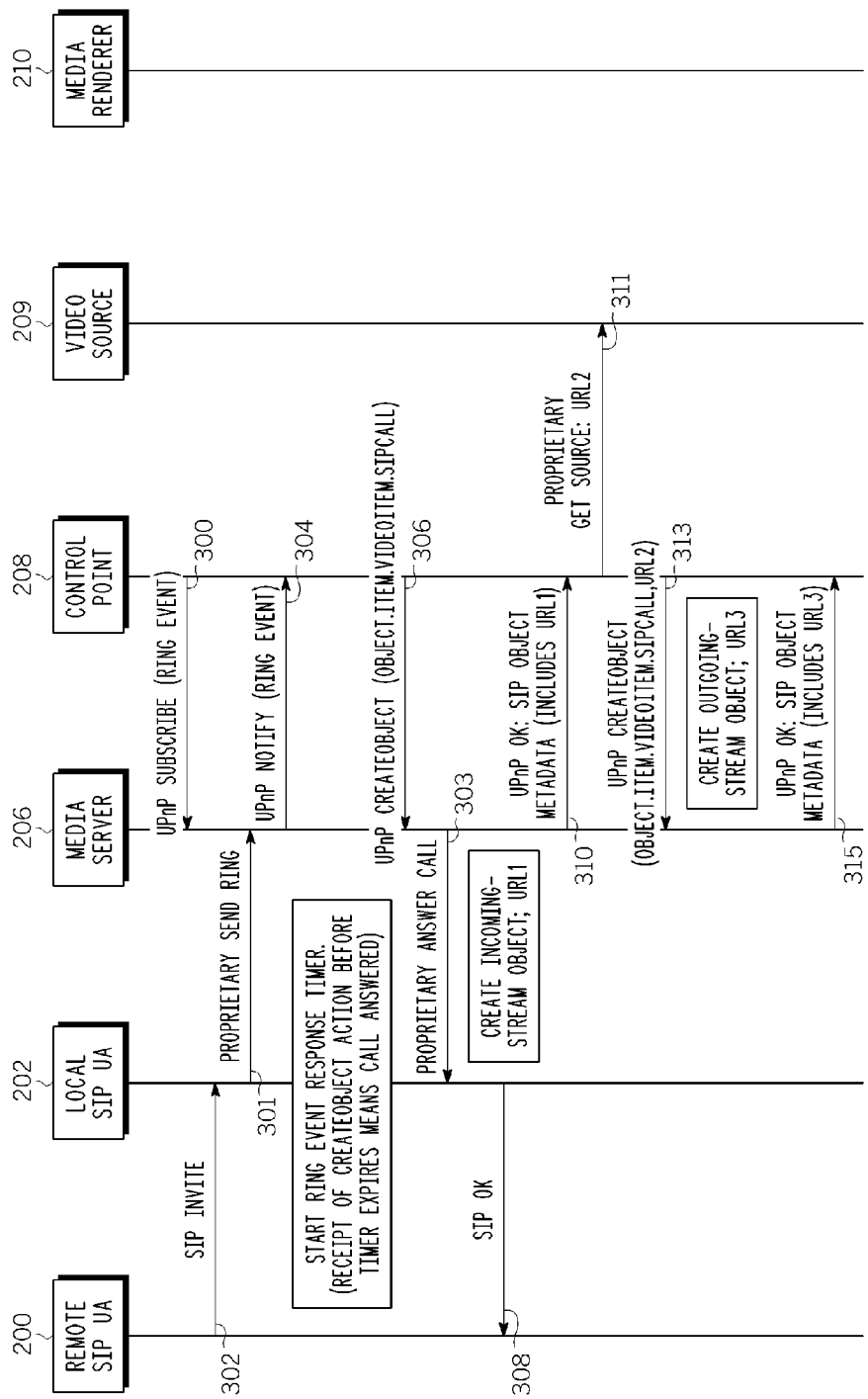
FIG. 3A is the first portion of a flow diagram illustrating an example of a flow of messages and content between the components shown in FIGS. 1, 2A and 2B during operation of an embodiment of the present invention.

When the SIP UA 202 receives an incoming SIP call (SIP invite 302), the SIP UA 202 invokes a proprietary send-ring message 301, as shown in FIG. 3A, to inform the UPnP media server 206 of this call. This triggers the media server to send a UPnP event to the subscribed UPnP control point 208 as a ring event 304. If the end user answers the call, the standard UPnP action CreateObject is sent by the UPnP control point 208 to the UPnP media server 206 in transmission 306; this makes the media server 206 send a proprietary answer-call message 303 to SIP UA 202. The media server 206 then creates the incoming-stream object and assigns it a Uniform Resource Locator 1 (URL1). The SIP UA 202 sends a SIP OK message 308 to the remote SIP terminal 200 to confirm the SIP Invite.

At this point, the incoming stream object's metadata is not yet populated. The object creation is completed once the call session is established, at which point the UPnP media server 206, sends an OK response 310 to the control point 208, as shown in FIG. 3A.

Now to make a two-way conversation possible, the following message flow occurs. When the UPnP OK message 310 is received, the control point 208 invokes a proprietary get-source message 311 to setup the source of video 209 for the outgoing stream. An example of this video source 209 is a video camera and microphone embedded in the same chassis as the control point 208. Communication between the UPnP control point 208 and this video source 209 is through proprietary messages. When done with the initialization, the control point 208 sends a UPnP CreateObject action 313 to the media server 206, informing the server of the Uniform Resource Locator 2 (URL2) of the video source 209. The media server 206 creates another UPnP object in its Content Directory for this outgoing video stream and assigns it a Uniform Resource Locator 3 (URL3) which points to the URL2 specified by the control point 208. It then sends a UPnP OK message 315 to the control point 208 to confirm the object creation.

The resource associated with the incoming video stream can now be redirected to the UPnP media renderer 210 in the local network 100.

Figure 3B:
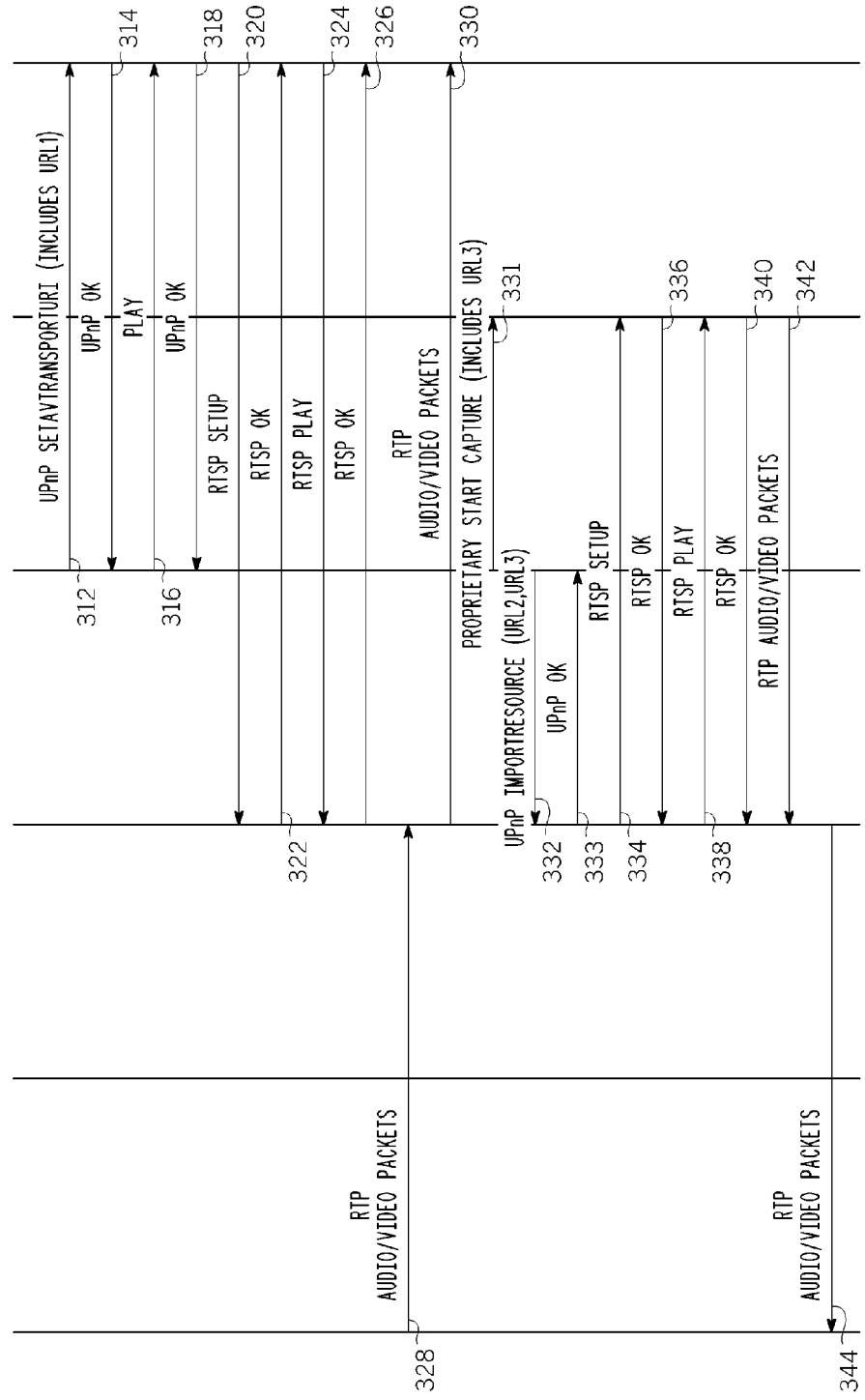
FIG. 3B is the second portion of the flow diagram identified in FIG. 3A.

That is, as shown in FIG. 3B, the UPnP control point 208 sends a UPnP Set AVTransportURI 312 (including a first URL designated URL1) to the UPnP media renderer 210 and, when successfully received by the UPnP media renderer 210, the UPnP media renderer 210 sends a UPnP OK transmission 314 back to the UPnP control point 208. The UPnP control point 208 then sends a PLAY command 316 to the UPnP media renderer 210 and, when successfully received by the UPnP media renderer 210, the UPnP media renderer 210 sends a UPnP OK transmission 318 back to the UPnP control point 208.

Continuing on with FIG. 3B, the UPnP media renderer 210 then sends an RTSP Setup command 320 to the media server 206 and, when successfully received, the UPnP media server 206 sends an RTSP OK message 322 back to the UPnP media renderer 210. The UPnP media renderer 210 can then send an RTSP Play command 324 to the media server 206 and, when successfully received, the UPnP media server 206 sends an RTSP OK message 326 back to the media server 206. Afterward, the remote SIP terminal 200 can send RTP audio/video packets 328 to the UPnP/SIP gateway 204. As discussed above, the SIP UA 202 and UPnP media server 206 can communicate with each other using internal (i.e., proprietary) messaging schemes, so that the UPnP media server 206 then provides the RTP audio/video packets 330 to the media renderer 210 for presentation.

Once the SIP session is established between the remote SIP device and the SIP UA 202 inside the house, a video stream from inside the house can also be sent back to the remote SIP device over the same SIP session. To start sending this outgoing stream, the UPnP control point 208 invokes the video source 209 to start the capture of video using a proprietary message 331. Upon return, the control point 208 sends a UPnP ImportResource action 332 to the media server 206 so the server knows from where to pull the outgoing video stream. URL2 is the source (video source) and URL3 is the destination (outgoing video stream object previously created). This triggers the UPnP media server 206 to start the stream transfer from video source to media server and out to the remote SIP UA 200. A UPnP OK message 333 is sent back to the control point 208 to confirm the action. This is similar to a content upload scenario using HyperText Transport Protocol (HTTP) that UPnP media servers can be capable of, except the transport protocol used here is RTSP/RTP.

The UPnP media server 206 is now ready to pull the outgoing stream via the out-of-band protocol RTSP/RTP. It sends an RTSP Setup command 334 to the video source 209 and, when successfully received, the video source 209 sends an RTSP OK message 336 back to the UPnP media server 206. The UPnP media server 206 can then send an RTSP Play command 338 to the video source 209 and, when successfully received, it sends an RTSP OK message 340 back to the UPnP media server 206. Afterward, the video source 209 sends RTP audio/video packets 342 to the UPnP media server 206. As discussed above, the SIP UA 202 and UPnP media server 206 can communicate with each other using internal (i.e., proprietary) messaging schemes, so that the SIP UA 202 then provides the RTP audio/video packets 344 to the remote SIP terminal 200.

As can be further appreciated from FIGS. 3A and 3B, embodiments of the present invention will also operate for outgoing SIP calls. In this case, when the user wants to make a SIP call through the UPnP media server 206, the UPnP control point 208 also sends a CreateObject action request with UPnP class "object.item.videoItem.sipCall" to the UPnP media server 206 as in transmission 306. This action and class indicate to the UPnP media server 206 that the call will be a SIP call so that the UPnP media server 206 makes the necessary function calls to the SIP UA 202 to start a session. The object is successfully created in the UPnP Content Directory when the SIP session and RTP stream is established. The rest of the message exchange will be similar to the incoming SIP call.

As can be appreciated from the above, the embodiment of the present invention described herein can be employed on a UPnP media server, that enables video streaming between SIP devices and UPnP devices without the need for the UPnP endpoint to support SIP, by representing a SIP session by a UPnP Content Directory Object implemented on the UPnP media server. Video streaming is thus enabled between a SIP device and a non-SIP UPnP device.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system for redirecting a session initiation protocol (SIP) based call stream to at least one universal plug and play (UPnP) device in a local network, the system comprising:
   a SIP user agent, operable to engage in a SIP-based video session with a SIP terminal located outside of the local network;

a UPnP media server, operable to create a UPnP Content Directory object that represents a call stream of the SIP-based video session, wherein the UPnP Content Directory object comprises a uniform resource locator (URL) of the call stream and the call stream is an incoming call stream, and operable to create a second UPnP Content Directory object that represents an outgoing call stream of the SIP-based video session, wherein the second UPnP Content Directory object comprises a second URL associated with the outgoing call stream; and a UPnP control point, operable to access the UPnP Content Directory object, obtain the URL, and use the URL to configure a media renderer within the local network to receive video packets from the SIP terminal and operable to access the second UPnP Content Directory object, obtain the second URL, and use the second URL to configure a video source within the local network to send video packets to the SIP terminal.

2. A system as claimed in claim 1, wherein:
the UPnP media server and the SIP user agent are employed in a residential gateway associated with the local network.

3. A system as claimed in claim 1, wherein:
the UPnP media server, the SIP user agent, and a UPnP control point are deployed in a device associated with the local network, wherein the device is selected from the group consisting of a mobile device, a cellular phone, and a set-top box.

4. A method for redirecting a session initiation protocol (SIP) based call stream to at least one universal plug and play (UPnP) device in a local network, the method comprising:
operating a SIP user agent to engage in a SIP-based video session with a SIP terminal located outside of the local network;
operating a UPnP media server to create a UPnP Content Directory object that represents a call stream of the SIP-based video session, wherein the UPnP Content Directory object comprises a uniform resource locator (URL) of the call stream and wherein the call stream is an incoming call stream;
operating a UPnP control point to access the UPnP Content Directory object, obtain the URL, and use the URL to configure a media renderer within the local network to receive video packets from the SIP terminal;
operating the UPnP media server to create a second UPnP Content Directory object that represents an outgoing call stream of the SIP-based video session, wherein the second UPnP Content Directory object comprises a second URL associated with the outgoing call stream; and
operating the UPnP control point to access the second UPnP Content Directory object, obtain the second URL, and use the second URL to configure a video source within the local network to send video packets to the SIP terminal.

5. A method as claimed in claim 4, wherein:
the UPnP Content Directory object further comprises metadata information, and the call stream is an incoming call stream from a video source associated with the SIP terminal.

6. A method as claimed in claim 4, wherein:
the UPnP device includes a media renderer for presenting the multimedia content transferred in the call stream.

7. A method as claimed in claim 4, wherein:
the UPnP media server and the SIP user agent are employed in a gateway associated with the local network.

8. A local network comprising:
at least one universal plug and play (UPnP) device;
a SIP user agent, operable to engage in a SIP-based video session with a SIP terminal located outside of the local network;
a UPnP media server, operable to create a UPnP Content Directory object that represents a call stream of the SIP-based video session, wherein the UPnP Content Directory object comprises a uniform resource locator (URL) of the call stream and wherein the call stream is an incoming call stream, and operable to create a second UPnP Content Directory object that represents an outgoing call stream of the SIP-based video session, wherein the second UPnP Content Directory object comprises a second URL associated with the outgoing call stream; and
a UPnP control point operable to access the UPnP Content Directory object, obtain the URL, and use the URL to configure a media renderer within the local network to receive video packets from the SIP terminal and operable to access the second UPnP Content Directory object, obtain the second URL, and use the second URL to configure a video source within the local network to send video packets to the SIP terminal.

9. A local network as claimed in claim 8, wherein:
the UPnP Content Directory object further comprises metadata information, and the SIP-based call stream is an incoming call stream from a video source associated with the SIP terminal.

10. A local network as claimed in claim 8, wherein:
the UPnP media server and the SIP user agent are deployed in a device associated with the local network, wherein the device is selected from the group consisting of a gateway, a mobile device, a cellular phone, and a set-top box.

* * * * *